US007995585B2

(12) United States Patent
Lee et al.

(10) Patent No.: US 7,995,585 B2
(45) Date of Patent: Aug. 9, 2011

(54) METHOD OF CONTROLLING TRANSMISSION RATES

(75) Inventors: Jung Ah Lee, Pittstown, NJ (US); Anil M. Rao, Cedar Knolls, NJ (US)

(73) Assignee: Alcatel Lucent, Paris (FR)

( * ) Notice: Subject to any disclaimer, the term of this patent is extended or adjusted under 35 U.S.C. 154(b) by 949 days.

(21) Appl. No.: 11/035,082

(22) Filed: Jan. 14, 2005

(65) Prior Publication Data

US 2006/0159013 A1    Jul. 20, 2006

(51) Int. Cl.
*H04L 12/56* (2006.01)
(52) U.S. Cl. ....................... 370/395.4; 370/229; 370/329
(58) Field of Classification Search .......... 455/450–453; 370/342, 395, 468, 395.4, 322, 329, 341, 370/437, 443, 458
See application file for complete search history.

(56) References Cited

U.S. PATENT DOCUMENTS

| | | | |
|---|---|---|---|
| 4,493,036 A * | 1/1985 | Boudreau et al. | 710/244 |
| 6,546,061 B2 * | 4/2003 | Signell et al. | 375/316 |
| 6,564,061 B1 * | 5/2003 | Guo et al. | 455/452.1 |
| 6,628,629 B1 * | 9/2003 | Jorgensen | 370/322 |
| 6,842,437 B1 * | 1/2005 | Heath | 370/322 |
| 7,027,400 B2 * | 4/2006 | O'Neill | 370/235 |
| 7,142,507 B1 * | 11/2006 | Kurimoto et al. | 370/229 |
| 2005/0030953 A1 * | 2/2005 | Vasudevan et al. | 370/395.4 |
| 2006/0067269 A1 * | 3/2006 | Jugl et al. | 370/329 |
| 2006/0224768 A1 * | 10/2006 | Allen | 709/234 |

OTHER PUBLICATIONS

"Reference Node-B Scheduler for EUL," TSGRI #35 (03)1246, 3GPP TSG RAN WGl, Qualcomm, Lisbon, Portugal, Nov. 2003.
"Description of EUL scheduler," TSGRI Rel-6 Ad-hoc (04)0698, 3GPP TSG RAN WGl, Samsung, Cannes, France, Jun. 2004.
3GPP TR 25.896 Version 2.0.0, Feasibility study for enhanced uplink for UTRA FDD. Third Generation Partnership Project, Mar. 2004.

\* cited by examiner

*Primary Examiner* — Ricky Ngo
*Assistant Examiner* — David Oveissi
(74) *Attorney, Agent, or Firm* — Harness, Dickey & Pierce, P.L.C.

(57) ABSTRACT

In an embodiment of the method, an estimated use of an uplink resource by prioritized users, if transmission rates for the prioritized users are granted, is determined. The transmission rates are then granted if the estimated use of the uplink resource is less than or equal to an available amount of the uplink resource. Otherwise, the granting of transmission rates of the prioritized users is controlled in order of lower priority prioritized users to higher priority prioritized users until the estimated use of the uplink resource by the prioritized users falls within the available amount of the uplink resource for the channel.

19 Claims, 2 Drawing Sheets

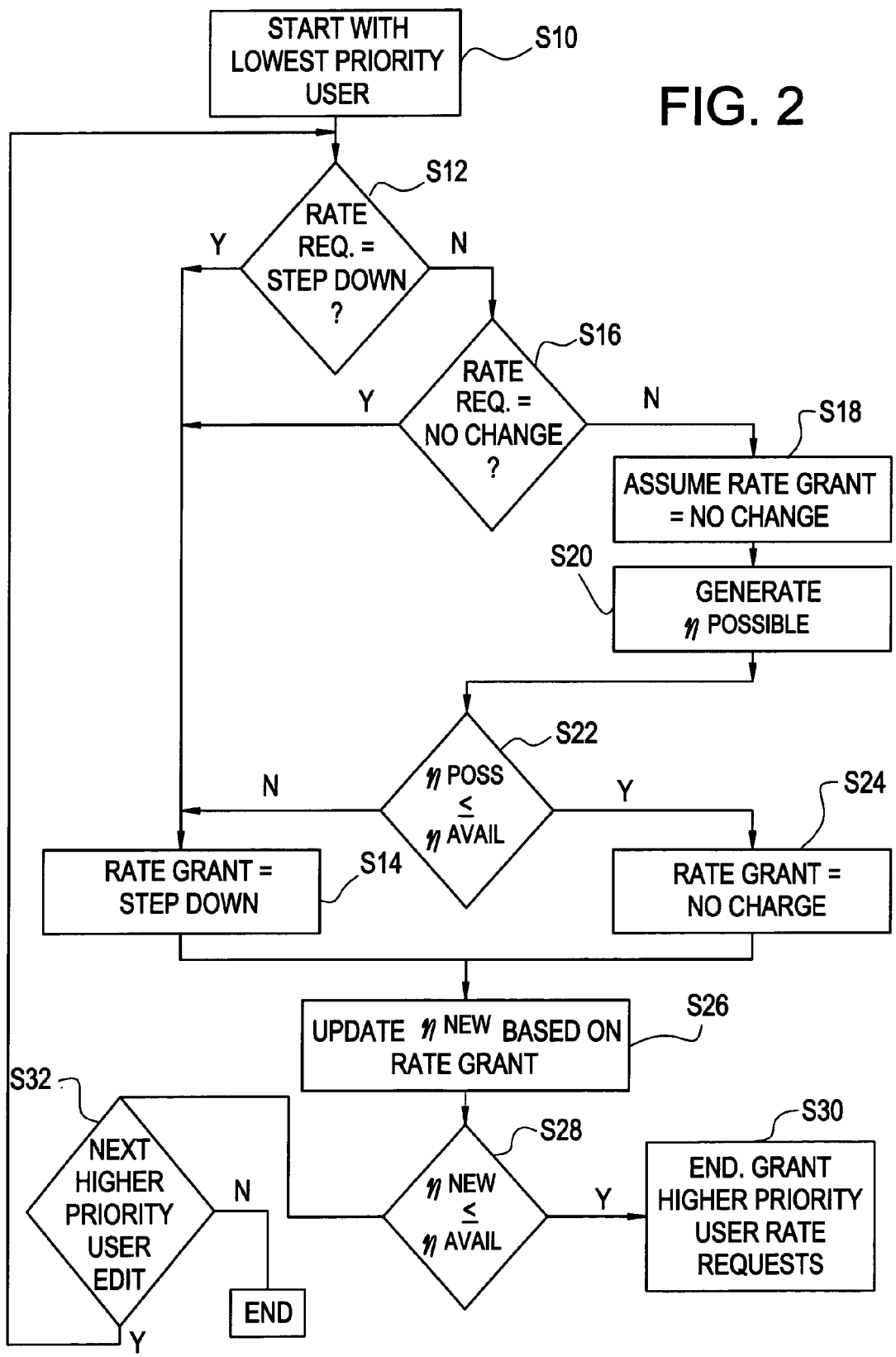

METHOD OF CONTROLLING TRANSMISSION RATES

BACKGROUND OF THE INVENTION

FIG. 1 illustrates a portion of a UMTS wireless communication network. As shown, user equipment (UE) wirelessly communicates with a Node-B serving the communication needs of a geographic area (often referred to as a cell or collection of cells). The UE may be a mobile phone, wireless equipped PDA, wireless equipped laptop, etc. The Node-B is often referred to as a base station in other communication standards. The Node-Bs communicate with a radio network controller (RNC). The RNC routes, for example, data between Node-Bs or on to another communication network such as the internet.

Communication from a Node-B to a UE is referred to as downlink or forward link communication, and communication from a UE to a Node-B is referred to as uplink or reverse link communication. In the uplink, various communication channels may exist.

In the UMTS uplink, a EDCH (Enhanced Dedicated Channel) is used to provide high-speed scheduled data service. In the EDCH, a distributed scheduling approach is taken where scheduling decisions are made at each Node-B and communicated to the UEs. A Node-B scheduler allocates the TFI (transport format indication) or TFC (transport format combination) that a UE can use, based on the available rise-over-thermal (RoT) target of a cell. Two types of rate scheduling approaches are supported in UMTS. In relative rate scheduling, a UE sends a 3 stage rate request relative to its current rate, based on its power limit and buffer status. The Node-B scheduler makes scheduling decisions and sends a relative rate grant (RG) message. In absolute rate scheduling, each UE reports its power limit and buffer status to the Node-B. The Node-B determines the allowed peak transmission rates and sends either the peak TFI or the peak traffic-to-pilotratio (TPR) that a UE can use for EDCH communication.

The 3GPP contributions "Reference Node-B scheduler for EUL," TSGR1#35(03)1246, 3GPP TSG RAN WG1, Qualcomm, Lisbon, Portugal, November 2003., and "Description of EUL scheduler," TSGR1 Rel-6 Ad-hoc(04)0698, 3GPP TSG RAN WG1, Samsung, Cannes, France, June 2004., describe scheduling algorithms based on a greedy filling of available RoT. These scheduling methods compute a priority function based on the requested rate and the average rate of the UEs. The scheduler grants the right to transmit starting from the highest priority UE or user, then, successively to the lower priority users. However, this method may penalize high-priority users, when the available RoT is smaller than what is required to support all the users rate requests.

SUMMARY OF THE INVENTION

The present invention provides a scheduling method that maximizes the likelihood that a user's (e.g., a UE's) requested rate is granted, without penalizing high-priority users. The scheduler processes users starting from the lowest priority. The method supports both relative and absolute rate scheduling. The method is easy to implement and the computational complexity is particularly low, when the cell load is small.

In an embodiment of the method, an estimated use of an uplink resource by prioritized users, if transmission rates for the prioritized users are granted, is determined. The transmission rates are then granted if the estimated use of the uplink resource is less than or equal to an available amount of the uplink resource. Otherwise, the granting of transmission rates of the prioritized users is controlled in order of lower priority prioritized users to higher priority prioritized users until the estimated use of the uplink resource by the prioritized users falls within the available amount of the uplink resource for the channel. The uplink resource may be load, rise-over-thermal, etc.

BRIEF DESCRIPTION OF THE DRAWINGS

The present invention will become more fully understood from the detailed description given herein below and the accompanying drawings which are given by way of illustration only, wherein like reference numerals designate corresponding parts in the various drawings, and wherein:

FIG. 2 illustrates a flow chart of a method of controlling transmission rates according to an embodiment of the present invention.

DETAILED DESCRIPTION OF THE EMBODIMENTS

Figure 1:
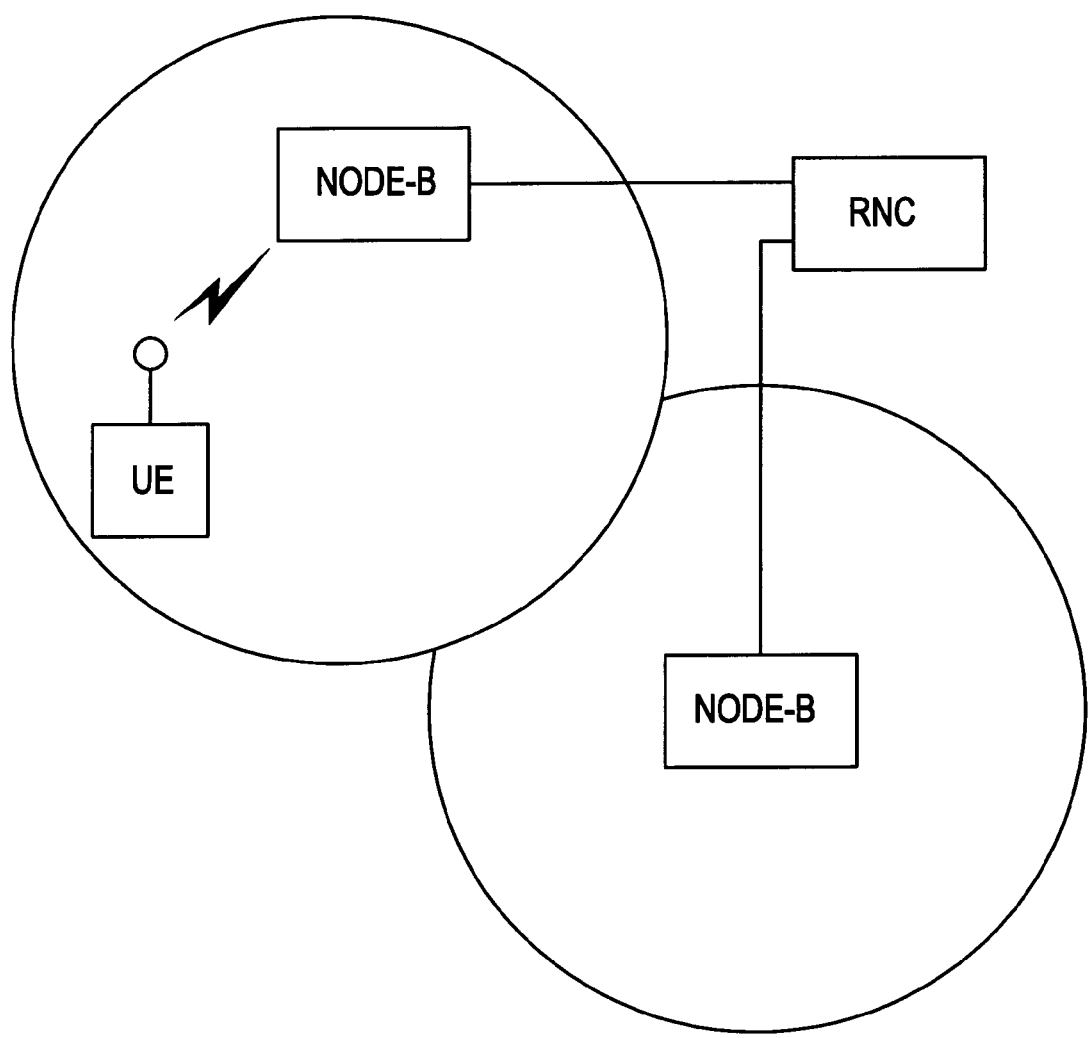
FIG. 1 illustrates a portion of a conventional UMTS wireless communication system.

First, an embodiment of a relative rate scheduling method according to the present invention will be described. This will be followed by a description of an absolute rate scheduling method embodiment of the present invention.

Relative Rate Scheduling

In relative rate scheduling, a UE sends a 1 bit rate request (RR) signal to a Node-B. The Node-B makes scheduling decisions based on, for example, target loading. While this embodiment will be described using the example of load as the uplink resource for basing scheduling decisions, it will be appreciated that other uplink resources such as rise-over-thermal (RoT) may be used for basing scheduling decisions.

The available loading that can be allocated to the EDCH is computed. Then, a hypothetical or estimated loading is computed assuming all EDCH rate requests are granted. If the estimated loading exceeds the available loading, EDCH TFI is reduced starting from the lower priority user until the loading condition is met. Once the loading condition is met, rate requests for the remaining higher priority users are granted. This scheduling method will now be described in greater detail below.

1. Rate Request: The rate request may be determined from a UE's buffer status and power limits. Required rate $R_k^{UE}$ may be determined from:

$$R_k^{UE} = \min[R_k^{max,power}, \arg\max\{R|Q \geq R \times T_{SP}\}] \quad (1)$$

where $R_k^{max,power}$ is the maximum TFI that is allowed based on UE power limit, Q is buffer depth, and $T_{SP}$ is the scheduling period. The UE sends a rate request signal RR having one of 3 states [STEP_UP, STEP_DOWN, NO_CHANGE], indicating rate increase, decrease, or no change relative to the current TFI (indicative of the current transmission rate) for the UE. Power limit TFI selection is specified in *Feasibility study for enhanced uplink for UTRA FDD*, 3GPP TR 25.896 Version 2.0.0, Third Generation Partnership Project, March 2004. At Node-B j, the requested rate for user or UE k at time n may be determined as:

$$R_{jk}^{Req}(n) = \begin{cases} R_{jk}(n-1)+1 & \text{if } RR = \text{'STEP\_UP' and } R_{jk} < R^{max} \\ Rjk(n-1)+1 & \text{if } RR = \text{'STEP\_DOWN' and } Rjk > R^{min} \\ Rjk(n-1) & \text{otherwise} \end{cases} \quad (2)$$

2. Priority Function: At the Node-B, UEs are ordered according to a priority function, starting from the highest priority user. In a proportional fairness scheduler, the priority function may be computed as according to the following expression:

$$P_{jk}(n) = \frac{R_{jk}^{Req}(n)}{\overline{R}_{jk}(n)} \quad (3)$$

where $\overline{R}_{jk}(n)$ is the average allocated rate of user k. The average allocated rate is computed as:

$$\overline{R}_{jk}(n) = \left(1 - \frac{1}{T_c}\right)\overline{R}_{jk}(n-1) + \left(\frac{1}{T_c}\right)R_{jk} \quad (4)$$

where $T_c$ is a time constant.

3. Calculate target loading: The maximum loading allowed in a cell may be set such that the rise-over-thermal (RoT) overshoot probability is limited to a certain value. Any well-known overshoot control algorithm may be used to determine a target RoT. The maximum loading may be calculated from RoT target using the relation:

$$\eta^{Max} = 1 - \frac{1}{RoT_{Target}} \quad (5)$$

4. Calculate current loading: The current uplink loading may be calculated every scheduling period from the well-known receive signal strength indicator (RSSI) according to the following expression:

$$\eta = 1 - \frac{P_{th}}{RSSI} \quad (6)$$

where the RSSI is computed every scheduling period as the slot-rate RSSI averaged over a period of the scheduling interval, and $P_{th}$ is the well-known, measurable quantity, thermal noise power.

5. Calculate available loading: For a user k using rate $R_k$, the user's contribution to the loading of cell j may be computed as:

$$\eta_{jk}(R_k) = \frac{SIR_{jk}(R_k)}{1 + SIR_{jk}(R_k)} \quad (7)$$

where $SIR_{jk}(R_k)$ is the signal-to-noise ratio (SIR) of the EDCH channel for UE k when rate $R_k$ is used. The $SIR_{jk}(R_k)$ may be computed as:

$$SIR_{jk}(R_k) = (E_c/I_0)_{jk}[1 + (\beta_e/\beta_c)^2 \times N_{multicode}]. \quad (8)$$

where Ec/Io is the received energy per chip to total received power, $(\beta_e/\beta_c)^2$ is the transmit power ratio for EDCH, and $N_{multicode}$ is the number of multicodes used.

The available loading is calculated by calculating the loading due to other cell interference and dedicated channels (DCH), which are well-known channels set forth in UMTS. For example, DCH channels are used to carry uplink voice communication or low-latency constant rate data traffic. The loading from DCH users and other-cell interference $I_{oc}$ may be computed by:

$$\eta_j^{I_{DCH}+1} = \eta - \sum_{k, serving} \eta_{jk}(R_k). \quad (9)$$

The summation is over all the users that have cell j as their serving cell. Available loading for new EDCH transmission may then be calculated as:

$$\eta_j^{available} = \eta^{Max} - \eta_j^{I_{DCH}+1} - \sum_{k, Retx} \frac{SIR_{jk}(R_k)}{1 + SIR_{jk}(R_k)} \quad (10)$$

The last summation is for all on-going HARQ retransmissions of EDCH users.

6. Overload control If $\eta_j^{available} < 0$, the scheduler cannot allocate resource to any new EDCH transmission. As a result, the schedule steps down all users (UEs) rates as follows:

$$RG_{jk}(n) = \begin{cases} \text{'STEP\_DOWN'} & \text{if } R_{jk}(n-1) > R^{min} \\ \text{'NO\_CHANGE'} & \text{otherwise} \end{cases} \quad (11)$$

Here, RG stands for relative rate grant.

7. Calculate hypothetical (or, estimated) loading assuming all users rate requests are granted. If $\eta_j^{available} \geq 0$, then, the scheduler calculates the hypothetical or estimated loading if all rate requests are granted according to the following:

$$\eta_j^{hyp} = \sum_k \eta_{jk}(R_k^{Req}) \quad (12)$$

8. Grant all users rate requests if estimated load is less than or equal to the available load. If $\eta_j^{hyp} \leq \eta_j^{available}$, the scheduler grants all users' rate requests.

9. Determine granted rates in reverse priority order If estimated load is greater than the available load. If $\eta_j^{hyp} > \eta_j^{available}$, the scheduler begins selectively reducing the rates of the users starting from the lowest priority user. After each rate reduction, the scheduler updates the estimated load in light of the rate reduction. When the estimated load becomes less than or equal to the available load, the scheduler discontinues the rate reduction process and grants the requested rates of the remaining higher priority users. This rate reduction process will now be described in detail with reference to the flow chart illustrated in FIG. 2.

As shown, in step S10, processing starts with the lowest priority user. Then, in step S12, the scheduler determines if the rate request for this user is a step down request. If so, the rate request is granted in step S14, and processing proceeds to step S26.

If, in step S12, the scheduler determines that the rate request is not a step down, then in step S16, the scheduler determines if the rate request is a no change request. If so, then processing proceeds to step S14 where the scheduler assigns a rate grant of step down. Namely, if the UE requests to transmit at the same rate as the previous transmission, the scheduler decreases the transmission rate. Processing then proceeds to step S26.

If, in step S16, the scheduler determines that the rate request is not a no change request, then the rate request is a step up request. In step S18, the scheduler treats the rate request as a no change request, and in step S20 determines a new possible estimated load assuming the rate request is a no change request. Subsequently, in step S22, the scheduler determines if the new possible estimated load is less than or equal to the available load. If so, then the scheduler assigns a rate grant of no change. Namely, if the UE requests to transmit at higher rate than the previous transmission, the scheduler assigns the same transmission rate as the previous transmission. Processing then proceeds to step S26. However, if in step S22, the scheduler determines that the new possible estimated load is greater than the available load, then processing proceeds to step S14 where the scheduler assigns a rate grant of step down. Processing then proceeds to step S26.

In step S26, the scheduler updates the estimated load based on the rate granted to the UE under consideration. The scheduler then determines if the updated, estimated load is less than or equal to the available load in step S28. If so, then the scheduler grants the rate requests of all high priority users and processing ends. However, if the estimated load is still greater than the available load in step S28, then in step S32, the scheduler determines if a next higher priority user exists or not. If not, then processing ends. If a next higher priority user exists, then processing returns to step S12 for the next higher priority user.

Absolute Rate Scheduling

In absolute rate scheduling, a UE sends scheduling information such as available power and queue size to the Node-B. The Node-B scheduler estimates the required maximum TFC for each UE. The scheduler then determines a maximum TFC allowed for each UE similar to the relative rate scheduling embodiment described above. This absolute rate scheduling methodology will be now described in more detail.

1. Calculate required rate: The Node-B determines a UE's required rate based on the UE's buffer status and power limits. For example, the required rate may be determined as in Eq. (1). In a special case, the required rate may be characterized as in equation (2). Namely, with respect to equation (2), if the Node B determines a required rate that is greater than the previous transmission rate for the UE, the required rate is characterized as a step up request; if the Node-B determines the required rate is the same as the previous transmission rate for the UE, the required rate is characterized as a no change request; and if the Node-B determines the required rate is less than the previous transmission rate for the UE, the required rate is characterized as a step down request.

2. Calculate available loading and hypothetical (or estimated) loading. The available and estimated loading may be determined in the same manner as described above in steps 5 and 7 for relative rate scheduling.

3. Overload control If $n_j^{available} < 0$, the scheduler cannot allocate uplink resource to any new EDCH transmission. As a result, the schedule steps down all users (UEs) rates as follows:

$$RG_{jk}(n) = R^{min} \quad (13)$$

4. Grant all users rate requests. If $\eta_j^{hyp} \leq n_j^{available}$, the scheduler grants all users' rate requests.

5. Determine granted rates in reverse priority order. If $\eta_j^{hyp} > n_j^{available}$, the scheduler selectively reduces the rates for users starting from the lowest priority user. After each rate reduction, the scheduler updates the estimated load in light of the rate reduction. When the estimated load becomes less than or equal to the available load, the scheduler discontinues the rate reduction process and grants the requested rates of the remaining higher priority users. For example, based on the characterization of the rate requests in step 1, the scheduler may employ the rate reduction process of FIG. 2 described in detail above.

When reducing the requested rate in step S14, the scheduler can step down rates by a fixed decrement as in relative rate scheduling, or the scheduler may aggressively step down a user's rate all the way down to an autonomous set rate (e.g., a minimum set rate). It will also be appreciated that other methodologies for determining the amount to step down the transmission rate may be used without departing from the present invention.

The invention being thus described, it will be obvious that the same may be varied in many ways. For example, while the embodiments described above concerned the EDCH in a UMTS wireless communication system, the present invention is not limited in application to this channel or a UMTS system. Such variations are not to be regarded as a departure from the invention, and all such modifications are intended to be included within the scope of the invention.

We claim:

1. A method of controlling transmission rates of prioritized users on a channel in a wireless communication system, the prioritized users having a first priority order, the method comprising:
    granting transmission rates, at a network node, in order of lower priority prioritized users to higher priority prioritized users until an estimated use of an uplink resource by the prioritized users falls within an available amount of the uplink resource for the channel, the estimated use being based on determined transmission rates for the prioritized users, the priority of a particular user being determined based on a requested rate of the particular user and an average allocated rate of the particular user, the granting retaining the first priority order of the users.

2. The method of claim 1, wherein the granting step selectively reduces the determined transmission rate of the prioritized users in order of lower priority prioritized users to higher priority prioritized users until the estimated use of the uplink resource by the prioritized users falls within the available amount of the uplink resource to obtain the granted transmission rates.

3. The method of claim 2, wherein the granting step selectively reduces the determined transmission rate by a fixed decrement amount.

4. The method of claim 2, wherein the granting step selectively reduces the determined transmission rate to a minimum transmission rate.

5. The method of claim 1, wherein the granting step controls the granted transmission rate of at least one prioritized user based on the determined transmission rate and a previous granted transmission rate.

6. The method of claim 5, wherein the granting step decreases the determined transmission rate of the prioritized user to obtain the granted transmission rate when the determined transmission rate is unchanged from the previous granted transmission rate.

7. The method of claim 5, wherein the granting step comprises:
    determining if maintaining a transmission rate of the prioritized user unchanged from the previous granted transmission rate results in the estimated use of the uplink resource falling within the available amount of the uplink resource if the determined transmission rate is greater than the previous granted transmission rate; and
    setting the granted transmission rate of the prioritized user to the previous granted transmission rate if the determining step determines that the maintaining results in the estimated use of the uplink resource falling within the available amount of the uplink resource.

8. The method of claim 7, wherein the granting step comprises:
decreasing the determined transmission rate to obtain the granted transmission rate if the determining step determines that the maintaining does not result in the estimated use of the uplink resource falling within the available amount of the uplink resource.

9. The method of claim 8, wherein the decreasing step decreases the determined transmission rate by a fixed decrement value.

10. The method of claim 8, wherein the decreasing step decreases the determined transmission rate to a minimum transmission rate.

11. The method of claim 5, wherein the granting step sets the granted transmission rate to the determined transmission rate if the determined transmission rate is less than the previous granted transmission rate.

12. The method of claim 1, wherein once the estimated use of the uplink resource falls within the available amount of the uplink resource, the granting step sets the granted transmission rates of the remaining prioritized users equal to the determined transmission rates for the remaining prioritized users.

13. The method of claim 1, further comprising:
determining the determined transmission rates; and
estimating the estimated use based on the determined transmission rates; and wherein
the granting step is performed if the estimated use of the uplink resource exceeds the available amount of the uplink resource.

14. The method of claim 1, wherein the determined transmission rate is determined based on a relative rate request received from the user.

15. The method of claim 1, wherein the determined transmission rate is an absolute rate determined based on operating parameters received from the user.

16. The method of claim 1, wherein the wireless communication system is a UMTS system, and the channel is an enhanced dedicated channel.

17. A method of controlling transmission rates of prioritized users on a channel in a wireless communication system, the prioritized users having a first priority order, the method comprising:
determining, at a network node, an estimated use of an uplink resource by the prioritized users if transmission rates for the prioritized users are granted; and
granting the transmission rates, at the network node, in order of lower priority prioritized users to higher priority prioritized users, if the estimated use of the uplink resource is less than or equal to an available amount of the uplink resource, the granting retaining the first priority order, the priority of a particular user being determined based on a requested rate of the particular user and an average allocated rate of the particular user.

18. The method of claims 17, further comprising:
determining the available amount of the uplink resource.

19. The method of claim 17, further comprising:
determining the transmission rates for the prioritized users.

* * * * *